US012700171B2

(12) United States Patent
Araújo et al.

(10) Patent No.: US 12,700,171 B2
(45) Date of Patent: Aug. 4, 2026

(54) GENERATION OF DENSE THREE-DIMENSIONAL POINT CLOUDS

(71) Applicant: Telefonaktiebolaget LM Ericsson (publ), Stockholm (SE)

(72) Inventors: José Araújo, Stockholm (SE); Volodya Grancharov, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 195 days.

(21) Appl. No.: 18/834,695

(22) PCT Filed: Feb. 1, 2022

(86) PCT No.: PCT/EP2022/052355
§ 371 (c)(1),
(2) Date: Jul. 31, 2024

(87) PCT Pub. No.: WO2023/147846
PCT Pub. Date: Aug. 10, 2023

(65) Prior Publication Data
US 2025/0139873 A1     May 1, 2025

(51) Int. Cl.
*G06T 15/20* (2011.01)
*G06T 7/579* (2017.01)
*G06T 7/73* (2017.01)
*G06T 7/90* (2017.01)

(52) U.S. Cl.
CPC .............. *G06T 15/20* (2013.01); *G06T 7/579* (2017.01); *G06T 7/74* (2017.01); *G06T 7/90* (2017.01);
(Continued)

(58) Field of Classification Search
CPC ........... G06T 15/05; G06T 7/579; G06T 7/74; G06T 7/90; G06T 2207/10024;
(Continued)

(56) References Cited

U.S. PATENT DOCUMENTS

| | | | |
|---|---|---|---|
| 2014/0232718 A1* | 8/2014 | Pollock | .................. G06T 17/10 345/420 |
| 2017/0046868 A1* | 2/2017 | Chernov | ................. G06T 7/246 |

(Continued)

OTHER PUBLICATIONS

Hodlmoser, Michael, "Sparse point cloud densification by using redundant semantic information" Proc. of the Int. Conf. on 3D Vision 2013, pp. 439-445 (Year: 2013).*

(Continued)

*Primary Examiner* — Terrell M Robinson
(74) *Attorney, Agent, or Firm* — Murphy, Bilak & Homiller, PLLC

(57) ABSTRACT

There is provided techniques for generating a dense 3D point cloud of a scene. A method is performed by an image processing device (400). The method comprises performing (S102) sequential matching for a set of images, obtained from an image scan of the scene, where each image has a color value and a depth value, to establish a correspondence between consecutive images in the set of images, to generate a sparse 3D point cloud from the images, and to estimate one camera pose value for each image. The method comprises determining (S104) one reliability value for each camera pose value. The method comprises generating (S114a) the dense 3D point cloud, when a lowest value of all determined reliability values is larger than a threshold reliability value, by densification of the sparse 3D point cloud and using the estimated camera pose values.

21 Claims, 5 Drawing Sheets

(52) U.S. Cl.
CPC ............... *G06T 2207/10024* (2013.01); *G06T 2207/10028* (2013.01); *G06T 2207/30244* (2013.01); *G06T 2210/56* (2013.01)

(58) Field of Classification Search
CPC . G06T 2207/10028; G06T 2207/30244; G06T 2210/56
See application file for complete search history.

(56) References Cited

U.S. PATENT DOCUMENTS

| | | | |
|---|---|---|---|
| 2019/0073787 A1* | 3/2019 | Lee | G06T 11/60 |
| 2020/0388004 A1* | 12/2020 | Zhang | G06T 3/147 |
| 2021/0241527 A1* | 8/2021 | Sun | G06T 17/20 |
| 2023/0135088 A1* | 5/2023 | Wang | G06N 3/09 |
| | | | 701/23 |

OTHER PUBLICATIONS

Do, Luat, "Dense range images from sparse point clouds using multi-scale processing," 2013, IEEE Workshop on Robot Vision (WORV), 2013, pp. 138-143, (Year: 2013).*

Matsuki, Hidenobu, "CodeMapping: Real-Time Dense Mapping for Sparse SLAM using Compact Scene Representations", Oct. 2021, IEEE Robotics and Automation Letters, vol. 6, No. 4, pp. 7105-7112 (Year: 2021).*

Campos, Carlos, et al., "ORB-SLAM3: An Accurate Open-Source Library for Visual, Visual-Inertial and Multi-Map SLAM", 2021 IEEE Transactions and Robotics, arXiv:2007.11898v2, 2021, 1-18.

Choi, Sungjoon, et al., "Robust Reconstruction of Indoor Scenes", 2015 Proceedings of the Conference on Computer Vision and Pattern Recognition, Computer Vision Foundation, 2015, 5556-5565.

Schönberger, Johannes L., et al., "Structure-from-Motion Revisited", 2016 Proceedings of the Conference on Computer Vision and Pattern Recognition, Computer Vision Foundation, 2016, 4104-4113.

Yamao, Sosuke, et al., "A Sequential Online 3D Reconstruction System Using Dense Stereo Matching", 2015 IEEE Winter Conference on Applications of Computer Vision, 2015, 1-8.

* cited by examiner

GENERATION OF DENSE THREE-DIMENSIONAL POINT CLOUDS

TECHNICAL FIELD

Embodiments presented herein relate to a method, an image processing device, a computer program, and a computer program product for generating a dense three-dimensional (3D) point cloud of a scene.

BACKGROUND

Within the technical field of digital imaging, a point cloud can be regarded as a set of data points in space. The points represent a 3D shape or object. Hereinafter it will be assumed that the point cloud represents a physical object. Dense point clouds (DPCs) are point clouds with comparably high number of data points, yielding high resolution of the physical object. Each point in the DPC has a set of X, Y and Z coordinates. DPCs are generally produced by 3D scanners or by photogrammetry software, which measure many points on the external surfaces of the physical object. As the output of 3D scanning processes, DPCs are used for many purposes, including to create 3D computer aided design (CAD) models for manufactured parts, for metrology and quality inspection, and for a multitude of visualization, animation, rendering and mass customization applications.

The process generating a 3D point cloud typically comprises a sparse modelling phase, where a sparse 3D point cloud is generated, and a dense modelling phase, where a densification step creates a final, dense, 3D point cloud. Existing software available for 3D reconstruction from 2D digital images enables creation of point clouds of the whole scene. The typical outcome of such software is a sparse 3D point cloud, i.e., a data structure representing the physical objects in 3D space but with less detail than the dense 3D point cloud.

FIG. 1 is a schematic diagram illustrating an image processing system 100. The image processing system 100 comprises different types of image scanning devices 110-a, 110-1b, . . . , 110-N, a first type of computing device 120, a second type of computing device 130, and a user interface device 140.

The different types of image scanning devices 110-a, 110-1b, . . . , 110-N are configured to capture images and thereby to scan an environment, or scene. In the illustrative example of FIG. 1, image scanning device 110-a represents an image capturing unit carried by an unmanned aerial vehicle, image scanning device 110-b represents a hand-held image capturing unit, and image scanning device 110-N represents a 360-degree (or omnidirectional) camera. The images captured by one or more of the image scanning devices 110-a, 110-1b, . . . , 110-N are provided to a first type of computing device 120 for processing.

The first type of computing device 120 is typically a hand-held computing device, such as a tablet computer or a laptop computer, or even a smartphone, with moderate to low computational capabilities. In contrast, the second type of computing device 130 is typically a cloud computational server with high computational capabilities.

Hence, in case algorithms with high computational requirements need to be performed when processing the digital images, the first type of computing device 120 forwards the images to the second type of computing device 130. This could, for example, be the case when an exhaustive matching algorithm is applied to the images in order to generate the sparse 3D point cloud. After having generated the dense 3D point cloud from the sparse 3D point cloud, the dense 3D point cloud is forwarded to the user interface device 140 for display and interaction with a user. In order to avoid some computationally heavy and time-consuming processing to be performed at the second type of computing device 130, some processing might instead be performed at the first type of computing device 120. This could, for example be the case when a sequential matching algorithm is applied to the images in order to generate the sparse 3D point cloud. In this case also the dense 3D point cloud could be generated at the first type of computing device 120 being forwarded to the user interface device 140. However, sequential matching algorithms generally cannot guarantee that the generated sparse 3D point cloud is sufficiently accurate for a dense 3D point cloud to be successfully generated.

That is, on the one hand, exhaustive matching algorithms can be used to generate sparse 3D point clouds that are sufficiently accurate for dense 3D point clouds to be successfully generated, but commonly require computationally heavy and time-consuming processing. On the other hand, whilst sequential matching algorithms can be used to avoid these issues, sequential matching algorithms might suffer from not being able to generate sparse 3D point clouds that are sufficiently accurate for dense 3D point clouds to be successfully generated.

SUMMARY

An object of embodiments herein is to address the above issues and to provide computationally efficient and yet accurate techniques for generating sparse 3D point clouds from which dense 3D point clouds could be generated.

According to a first aspect there is presented a method for generating a dense 3D point cloud $\Omega_D$ of a scene. The method is performed by an image processing device. The method comprises performing sequential matching for a set of K images $I_k$, where k=1 . . . K, obtained from an image scan of the scene, where each image $I_k$ has a color value and a depth value, to establish a correspondence between consecutive images $I_k$, $I_{k-1}$ in the set of K images, to generate a sparse 3D point cloud $\Omega_S$ from the K images, and to estimate one camera pose value $P_k$ for each image $I_k$. The method comprises determining one reliability value $\Psi_k$ for each camera pose value $P_k$. The method comprises generating the dense 3D point cloud $\Omega_D$, when a lowest value of all determined reliability values $\Psi_k$, k=1 . . . K, is larger than a threshold reliability value $\Theta$, by densification of the sparse 3D point cloud $\Omega_S$ and using the estimated camera pose values $P_k$, k=1 . . . K.

According to a second aspect there is presented an image processing device for generating a dense 3D point cloud $\Omega_D$ of a scene. The image processing device comprises processing circuitry. The processing circuitry is configured to cause the image processing device to perform sequential matching for a set of K images $I_k$, where k=1 . . . K, obtained from an image scan of the scene, where each image $I_k$ has a color value and a depth value, to establish a correspondence between consecutive images $I_k$, $I_{k-1}$ in the set of K images, to generate a sparse 3D point cloud $\Omega_S$ from the K images, and to estimate one camera pose value $P_k$ for each image $I_k$. The processing circuitry is configured to cause the image processing device to determine one reliability value $\Psi_k$ for each camera pose value $P_k$. The processing circuitry is configured to cause the image processing device to generate the dense 3D point cloud $\Omega_D$, when a lowest value of all determined reliability values $\Psi_k$, k=1 . . . K, is larger than a

3 threshold reliability value $\Theta$, by densification of the sparse 3D point cloud $\Omega_S$ and using the estimated camera pose values $P_k$, k=1 . . . K.

According to a third aspect there is presented an image processing device for generating a dense 3D point cloud $\Omega_D$ of a scene. The image processing device comprises a sequential matching module (910) configured to perform sequential matching for a set of K images $I_k$, where k=1 . . . K, obtained from an image scan of the scene, where each image $I_k$ has a color value and a depth value, to establish a correspondence between consecutive images $I_k$, $I_{k-1}$ in the set of K images, to generate a sparse 3D point cloud $\Omega_S$ from the K images, and to estimate one camera pose value $P_k$ for each image $I_k$. The image processing device comprises a determine module (920) configured to determine one reliability value $\Psi_k$ for each camera pose value $P_k$. The image processing device comprises a densification module configured to generate the dense 3D point cloud $\Omega_D$, when a lowest value of all determined reliability values $\Psi_k$, k=1 . . . K, is larger than a threshold reliability value $\Theta$, by densification of the sparse 3D point cloud $\Omega_S$ and using the estimated camera pose values $P_k$, k=1 . . . K.

According to a fourth aspect there is presented a computer program for generating a dense 3D point cloud of a scene, the computer program comprising computer program code which, when run on an image processing device, causes the image processing device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects address the above issues by providing computationally efficient and yet accurate techniques for generating sparse 3D point clouds from which dense 3D point clouds could be generated.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

4

Figure 5:
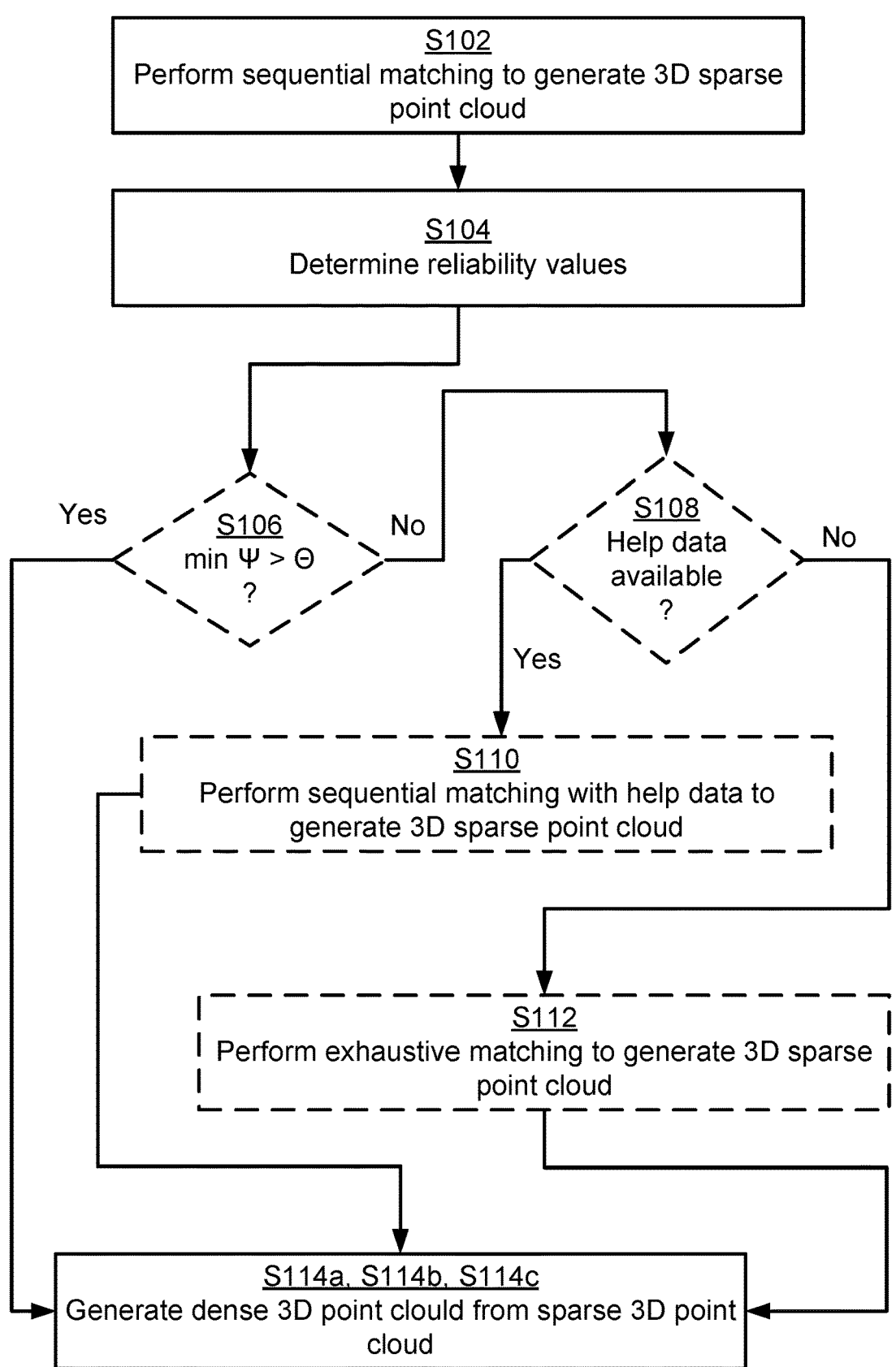
Figure 6:
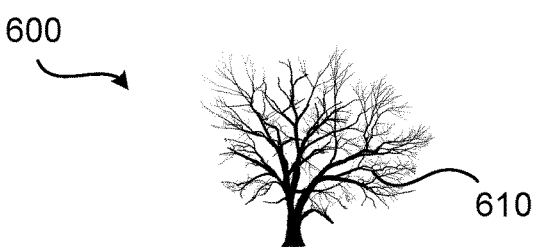
Figure 6:
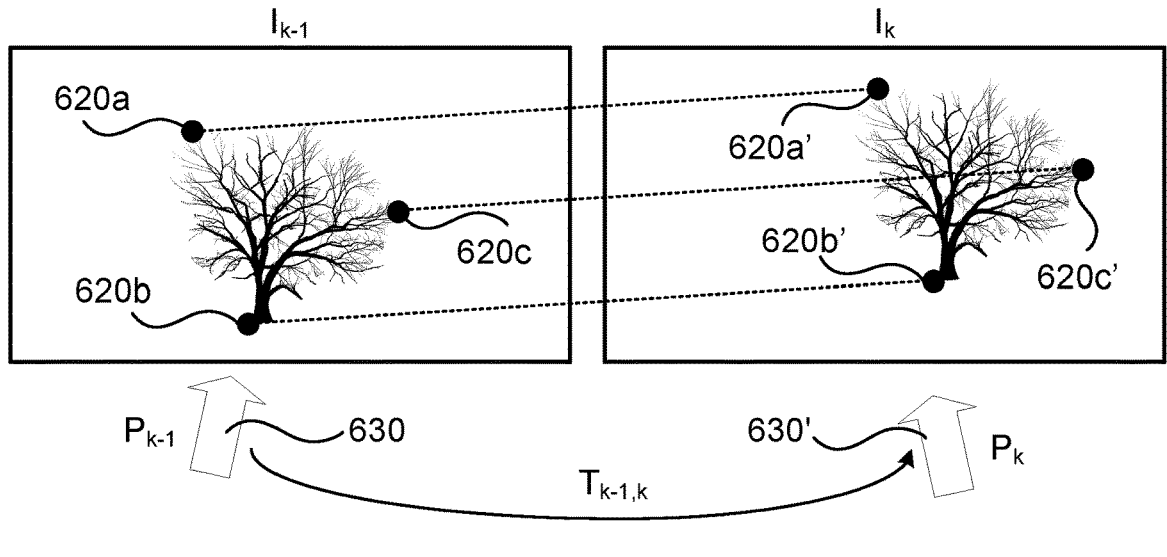
Figure 7:
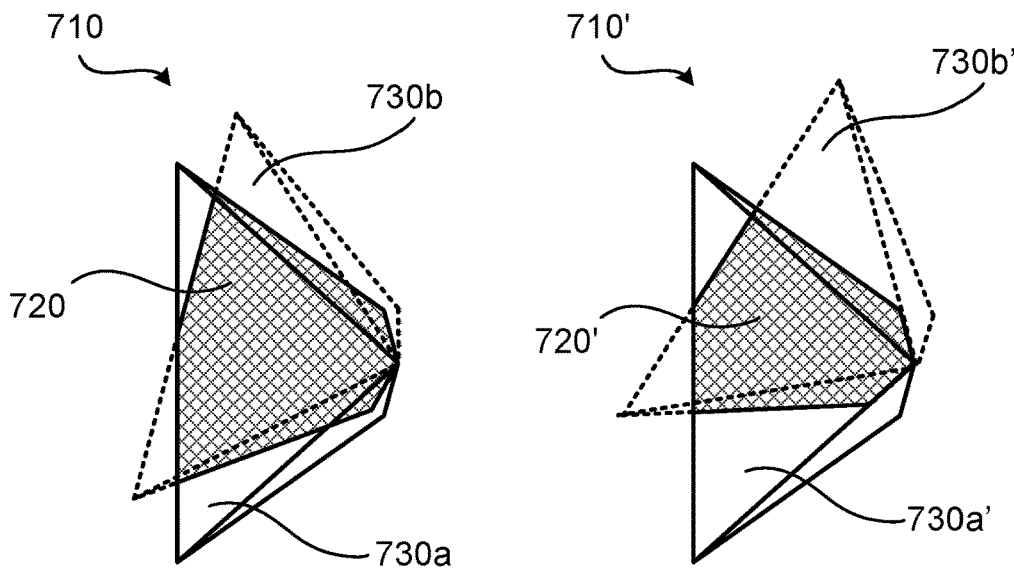
Figure 8:
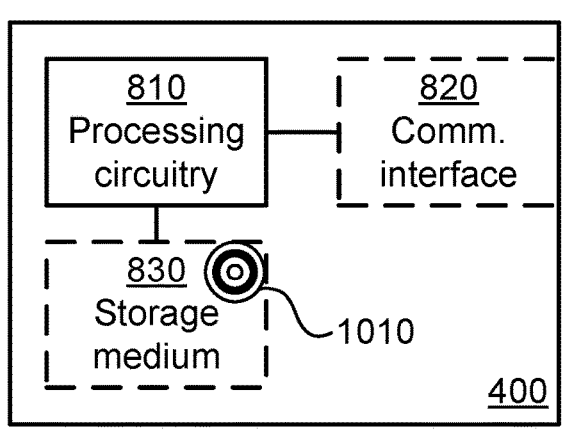
Figure 9:
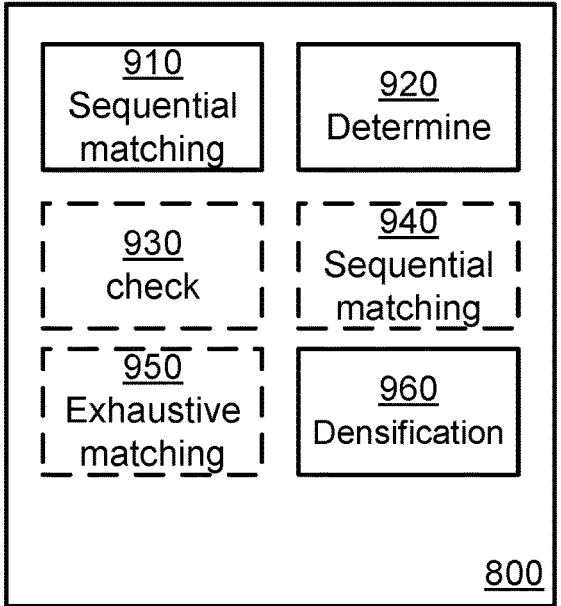
Figure 10:
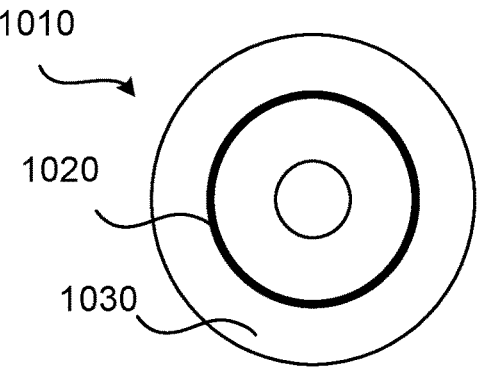

FIG. 5 is a flowchart of methods according to embodiments;

FIG. 6 schematically illustrates a scene and images captured of the scene according to an embodiment;

FIG. 7 schematically illustrates overlapping areas according to an embodiment;

FIG. 8 is a schematic diagram showing functional units of an image processing device according to an embodiment;

FIG. 9 is a schematic diagram showing functional modules of an image processing device according to an embodiment; and FIG. 10 shows one example of a computer program product comprising computer readable storage medium according to an embodiment.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
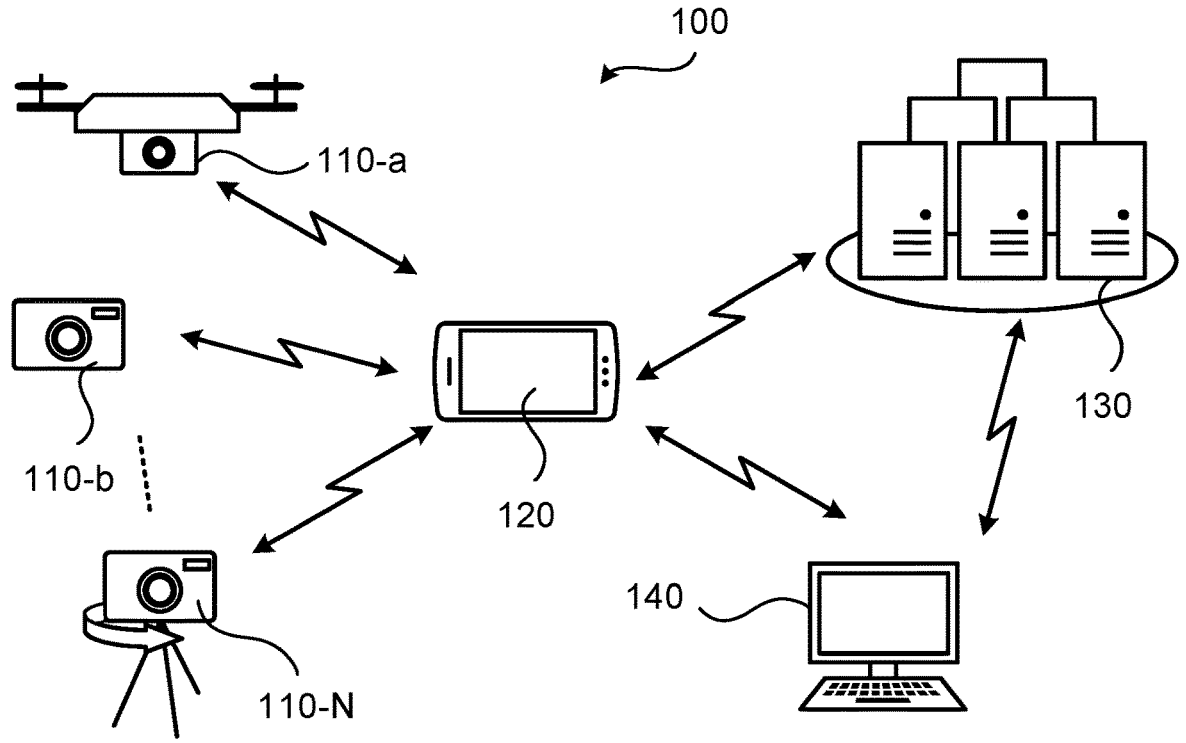
FIG. 1 is a schematic diagram illustrating an image processing system according to examples.

The issues noted above with reference to FIG. 1 will be further illustrated next with reference to FIGS. 2 and 3.

Figure 2:
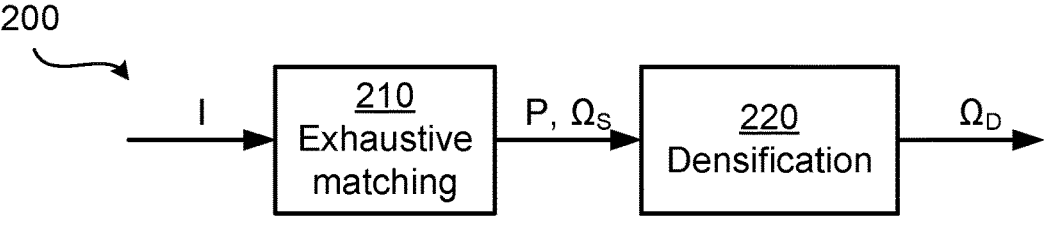
FIG. 2 is a schematic diagram illustrating an image processing system according to a first example.

FIG. 2 is a schematic diagram illustrating an image processing system 200 according to a first example. An exhaustive matching block 210 takes as input a set of K images $I_k$, where k=1 . . . K, and runs an exhaustive matching algorithm to generate a sparse 3D point cloud $\Omega_S$ from the K images and to estimate one camera pose value $P_k$ for each image $I_k$. A densification block 220 generates a dense 3D point cloud $\Omega_D$ based on the sparse 3D point cloud $\Omega_S$ and the camera pose values $P_k$. Whilst the exhaustive matching block 210 provides a sparse 3D point cloud $\Omega_S$ of high reliability, running the exhaustive matching algorithm might be computationally demanding. Further in this respect, the image processing system 200 requires a comparatively long period of time to be executed (such as at least several hours) and would typically require implementation on a device with comparatively large computational capacity, such as computing device 130.

Figure 3:
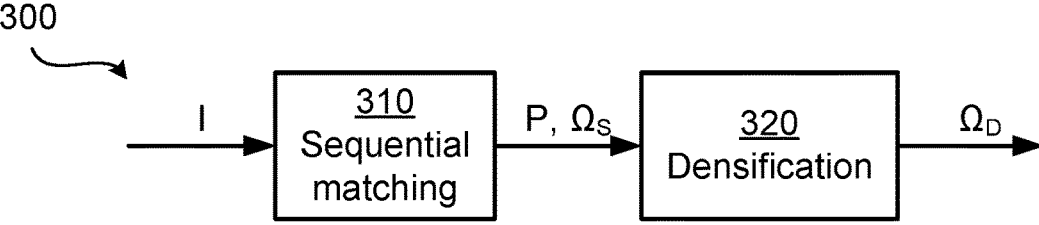
FIG. 3 is a schematic diagram illustrating an image processing system according to a second example.

FIG. 3 is a schematic diagram illustrating an image processing system 300 according to a second example. A sequential matching block 310 takes as input a set of K images $I_k$, where k=1 . . . K, and runs a sequential matching algorithm to generate a sparse 3D point cloud $\Omega_S$ from the K images and to estimate one camera pose value $P_k$ for each image $I_k$. A densification block 320 generates a dense 3D point cloud $\Omega_D$ based on the sparse 3D point cloud $\Omega_S$ and the camera pose values $P_k$. Whilst running running the sequential matching algorithm is less computationally demanding than running the exhaustive matching algorithm, the sequential matching algorithm provides a sparse 3D point cloud $\Omega_S$ of less reliability than the exhaustive matching algorithm. Further in this respect, although the image processing system 300 requires a comparatively short period of time to be executed (such as in a few minutes, but in any case at least much shorter than the image processing system 200) and might typically only require implementation on a device with comparatively small computational capacity, such as computing device 120, there is a risk that the provided sparse 3D point cloud $\Omega_S$ cannot be used to generate the dense 3D point cloud $\Omega_D$.

Further in this respect, a sparse 3D point cloud can be regarded as a set of points in 3D space that correspond to distinct features in colour images (red, green, and blue (RGB) images), or in depth maps, of a scene. Sparse 3D point clouds could be used to calculate camera pose values, or other types of features, such as key points, or tie points. Sparse 3D point clouds can be extracted from RGB images or depth images. The number of points in the sparse 3D point cloud is significantly less that the total number of pixels in the colour images or depth values in the depth maps from which the sparse 3D point cloud is generated. A dense 3D point cloud, on the other hand, can be regarded as a 3D representation of an entire set (usually after duplication removal) of depth values. Dense 3D point clouds are therefore, in terms of number of points, generally much larger that sparse 3D point clouds. For this reason, dense 3D point clouds are typically used for performing visual inspection of the scene reconstructed in 3D.

Whilst there are advantages for each of the image processing systems 200, 300, there are also disadvantages. One object of the herein disclosed embodiments is to form an image processing device where the advantages are retained but where the disadvantages are avoided. The embodiments disclosed herein in particular relate to techniques for generating a dense 3D point cloud $\Omega_D$ of a scene. In order to obtain such techniques there is provided an image processing device, a method performed by the image processing device, a computer program product comprising code, for example in the form of a computer program, that when run on an image processing device, causes the image processing device to perform the method.

Figure 4:
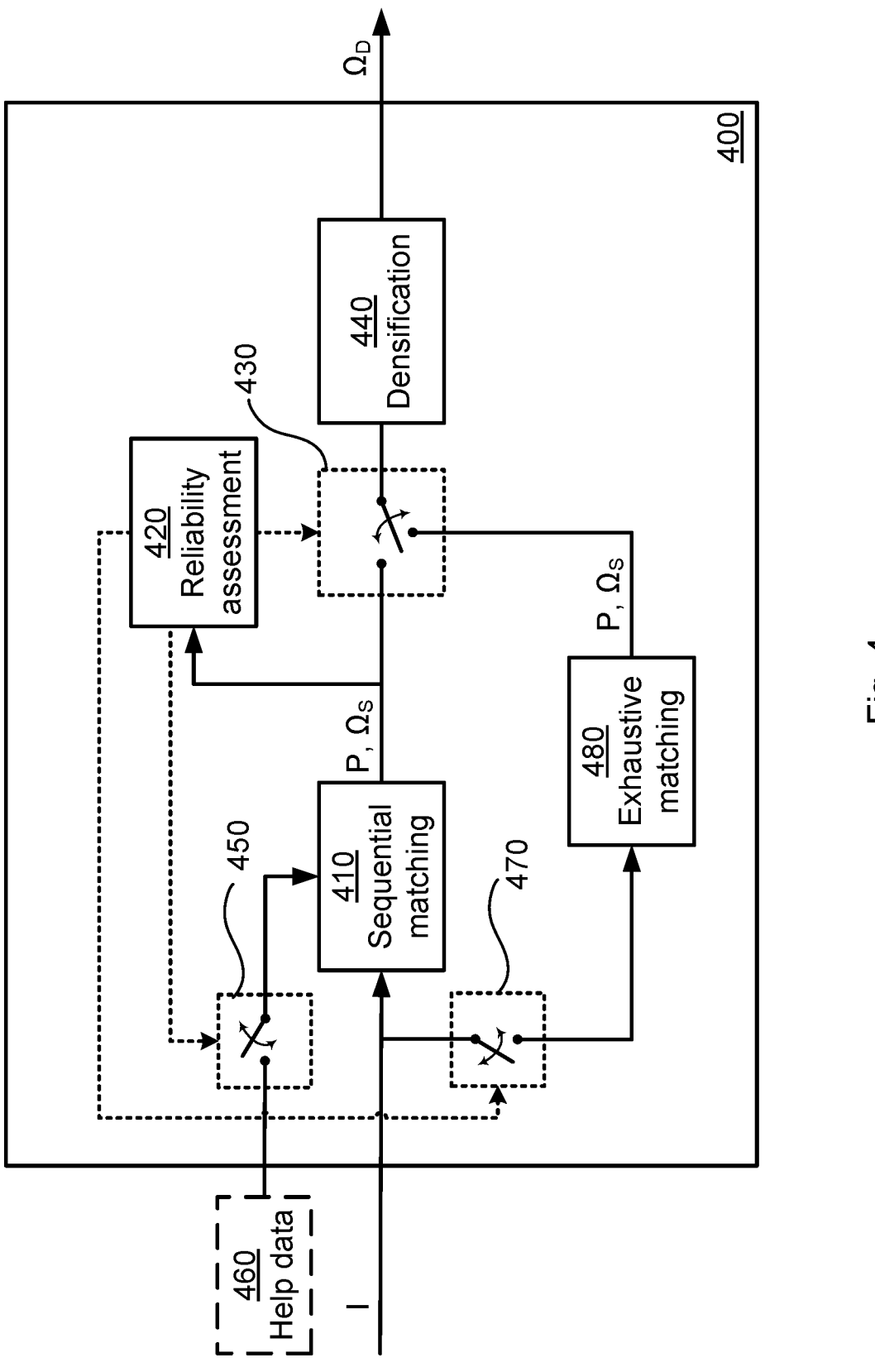
FIG. 4 is a schematic block diagram of an image processing device according to an embodiment.

FIG. 4 is a schematic block diagram of an image processing device 400 according to an embodiment. A sequential matching block 410 is configured to perform sequential matching for a set of K images $I_k$, where k=1 . . . K, to generate a sparse 3D point cloud $\Omega_S$ from the K images, and to estimate one camera pose value $P_k$ for each image $I_k$. A reliability assessment block 420 is configured to analyze the camera pose values $P_k$, for all k=1 . . . K, to determine one reliability value $W_k$ for each camera pose value $P_k$. In essence, if the analysis performed by the reliability assessment block 420 suggests that the camera poses can be reliably estimated (i.e., the camera pose values $P_k$ have high reliability), the image processing system 200 can be replaced with the image processing system 300. The reliability assessment block 420 is therefore configured to set three switches 430, 450, 470 depending on how the smallest reliability value $\Psi_{min}$ relates to a threshold reliability value $\Theta$. Particular criteria for setting the three switches 430, 450, 470 will be further disclosed below. A densification block 440 is configured to generates a dense 3D point cloud $\Omega_D$ based on parameters (camera pose values $P_k$ and a sparse 3D point cloud $\Omega_S$) provided either from the sequential matching block 410 or an exhaustive matching block 480, depending on how switch 430 is set. An optional help data block 460 (if present) comprises help data in terms of a new set of K' images being larger than the set of K images and/or help data in terms of a new set of K' images comprising more tagged objects than the set of K images. The new set of K' images is used by the sequential matching block 410 when switch 450 is set. The exhaustive matching block 480 is configured to perform exhaustive matching for the set of K images $I_k$, k=1 . . . K, to generate a 3D point cloud $\Omega_S$ from the K images and to estimate one camera pose value $P_k$ for each image $I_k$. The exhaustive matching block 480 is engaged to obtain the set of K images $I_k$ when switch 470 is set. Further aspects of the operation of the image processing device 400 will be disclosed next in conjunction with reference to FIG. 5.

FIG. 5 is a flowchart illustrating embodiments of methods for generating a dense 3D point cloud $\Omega_D$ of a scene. The methods are performed by the image processing device 400. The methods are advantageously provided as computer programs 1020.

S102: The image processing device 400 performs sequential matching for a set of K images $I_k$, where k=1 . . . K. The set of K images $I_k$ is obtained from an image scan of the scene. Each image $I_k$ has a color value and a depth value. The set of K images $I_k$, where k=1 . . . K, may have been acquired from any of the image scanning devices 110-$a$, 110-$b$, . . . , 110-N.

The sequential matching is performed to establish a correspondence between consecutive images $I_k$, $I_{k-1}$ in the set of K images. The sequential matching is further performed to generate a sparse 3D point cloud $\Omega_S$ from the K images. The sequential matching is yet further performed to estimate one camera pose value $P_k$ for each image $I_k$.

S104: The image processing device 400 determines one reliability value $W_k$ for each camera pose value $P_k$.

The sparse 3D point cloud $\Omega_S$ and the pose values $P_k$ resulting from the sequential matching in S102 is then used as input to generate the dense 3D point cloud $\Omega_D$ when the reliability of the pose values $P_k$ is good. In particular, the image processing device 400 is configured to perform S114$a$ when the lowest value of all determined reliability values $\Psi_k$, where k=1 . . . K, is larger than a threshold reliability value $\Theta$.

S114$a$: The image processing device 400 generates the dense 3D point cloud $\Omega_D$ by densification of the sparse 3D point cloud Is and using the estimated camera pose values $P_k$, for all k=1 . . . K.

Embodiments relating to further details of generating a dense 3D point cloud $\Omega_D$ of a scene as performed by the image processing device 400 will now be disclosed.

There may be different types of reliability values $\Psi_k$. Different embodiments relating thereto will now be described in turn.

According to a first embodiment, the reliability value $\Psi_k$ for each image $I_k$ pertains to a relative overlap in image areas between the consecutive images $I_k$, $I_{k-1}$. This reliability value will hereinafter be denoted $\Psi_{1,k}$. In some examples, consecutive images $I_k$, $I_{k-1}$ overlap an area $V_k$ in image $I_k$, and the reliability value $\Psi_{1,k}$ for image $I_k$ pertains to a ratio between the area $V_k$ and the image area $W_k$, where $W_k$ denotes the image area for image $I_k$.

According to a second embodiment, the correspondence between consecutive images $I_k$, $I_{k-1}$ was established based on a number of matching keypoints $N_k$, and the reliability value $\Psi_k$ for each image $I_k$ pertains to the relative number of matching keypoints $N_k$ per overlap in image areas between the consecutive images $I_k$, $I_{k-1}$. This reliability value will hereinafter be denoted $\Psi_{2,k}$. In some examples, one set of matching keypoints $N_k$ based on which the correspondence between consecutive images $I_k$, $I_{k-1}$ was established is identified for each image $I_k$, and the reliability value $\Psi_{2,k}$ for image $I_k$ pertains to a ratio between the number of matching keypoints $N_k$ and the area $V_k$ (where, as above, the area $V_k$ denotes the overlap in image area between consecutive images $I_k$, $I_{k-1}$ in image $I_k$).

It is here noted that both types of reliability values $\Psi_{1,k}$ and $\Psi_{2,k}$ can be used in parallel. In general terms, and as will be disclosed next, each of the types of reliability values $\Psi_{1,k}$ and $\Psi_{2,k}$ might be compared to its own threshold value $\Theta_1$, $\Theta_2$. That is, $\Theta=\Theta_1$ or $\Theta=\Theta_2$ depending on which type of reliability values are used.

As disclosed above, S114a is performed only when the reliability of the pose values $P_k$ is good. When the reliability of the pose values $P_k$ is not good enough, another action, or actions, thus needs to be performed in order to generate the dense 3D point cloud $\Omega_D$. In this respect, when the lowest value of all determined reliability values $\Psi_k$, k=1 . . . K, is not larger than the threshold reliability value $\Theta$, a sequential matching for a new set of K' images $$I'_{kr}, k' = 1... \ K',$$

obtained from a new image scan of the scene, might be performed. In particular, in some embodiments, the image processing device 400 is configured to perform (optional) steps S110 and S114b.

S110: When the lowest value of all determined reliability values $\Psi_k$, k=1 . . . K, is not larger than the threshold reliability value $\Theta$, the image processing device 400 performs sequential matching for a new set of K' images $$I'_{kr}, k' = 1... \ K'.$$

The new set of K' images $$I'_k,$$

is obtained from a new image scan of the scene. Each new image $$I'_k,$$

has a color value and a depth value. The new set of K' images comprises help data as compared to the set of K images. Different examples of such help data will be provided below.

The sequential matching is performed to establish a correspondence between consecutive images $$I'_{k'}, I'_{k'-1}$$

in the set of K' images, to generate a new sparse 3D point cloud $\Omega'_S$ from the K' images, and to estimate one new camera pose value $$P'_k$$

for each image $$I'_{k'}.$$

S114b: The image processing device 400 generates the dense 3D point cloud $\Omega_D$ by performing densification of the new sparse 3D point cloud $\Omega'_S$ and using the new estimated camera pose values $$P'_k, k' = 1... \ K'.$$

Aspects relating to the relation between different types of help data and the different types of reliability values $\Psi_{1,k}$ and $\Psi_{2,k}$ will be disclosed next.

In some aspects, for consecutive images $I_k$, $I_{k-1}$, the size (in pixels) of the back-projected area in the image plane overlapping part of the physical scene is calculated. This area is denoted $V_k$ and is normalized with the image size $W_k$, to give a fraction of the image $I_k$ comprising the same objects as $I_{k-1}$. This ratio then defines $\Psi_{1,k}$. That is:

$$\Psi_{1,k} = \frac{V_k}{W_k}$$

In particular, in some embodiments, the help data is provided in terms of the new set of K' images being larger than the set of K images when $$\Psi_{1,k} = \frac{V_k}{W_k} < \Theta_1.$$

In other words, when the overlap is too small, then $\Psi_{1,k}<\Theta_1$. This implies that another scan is to be made where consecutive images $I_k$, $I_{k-1}$ have more overlap so that a new sparse 3D point cloud $$\Omega'_S$$

can be generated, hopefully with higher reliability values. That is, the new set of K' images $$I'_k,$$

thus provides a denser scan of the scene than the original set of K images $I_k$. In other words, K'>K and both sets of images cover the same scene.

In some aspects, for consecutive images $I_k$, $I_{k-1}$, the number of matched key points $N_k$ is compared to the overlapping area $V_k$. This ratio then defines $\Psi_{2,k}$. That is:

$$\Psi_{2,k} = \frac{N_k}{V_k}$$

In particular, in some embodiments, the help data is provided in terms of the new set of K' images comprising more tagged objects than the set of K images when $$\Psi_{2,k} = \frac{N_k}{V_k} < \Theta_2.$$

In other words, when the number of matched points $N_k$ normalized with the overlapping area $V_k$ is too small, then $\Psi_{2,k} < \Theta_2$. This implies that more tagged objects need to be identified, or inserted, in the images so that a new sparse 3D point cloud $\Omega'_S$ can be generated, hopefully with higher reliability values.

In some aspects it is verified that help data is available before S110 (and S114b) is entered. In particular, in some embodiments, the image processing device 400 is configured to perform (optional) step S108.

S108: The image processing device 400 checks whether the help data is accessible or not to the image processing device 400. The sequential matching for the new set of K' images is performed when the help data is accessible to the image processing device 400.

In some aspects, help data is thus not accessible to the image processing device 400. In other aspects, help data is accessible and S110 is performed. However, it might still be that even if S110 is performed, i.e., the image processing device 400 performs sequential matching for the new set of K' images $$I'_{k'}, k' = 1 \dots K',$$

the new camera pose values $$P'_k$$

reveal that the resulting new sparse 3D point cloud $\Omega'_S$ is not good enough. Another action, or actions, thus needs to be performed in order to generate the dense 3D point cloud $\Omega_D$. In some aspects, a fall-back is then made to exhaustive matching. In particular, in some embodiments, the image processing device 400 is configured to perform (optional) steps S112 and S114c.

S112: When the lowest value of all determined reliability values $\Psi_k$, k=1 . . . K, is not larger than the threshold reliability value $\Theta$, the image processing device 400 performs exhaustive matching for the set of K images $I_k$, k=1 . . . K, to generate a new sparse 3D point cloud $$\Omega''_S$$

from the K images and to estimate one camera pose value $$P''_k$$

for each image $I_k$.

S114c: The image processing device 400 generates the dense 3D point cloud $\Omega_D$ by performing densification of the new sparse 3D point cloud $$\Omega''_S$$

and using the new estimated camera pose values $$P''_k, k = 1 \dots K.$$

In some embodiments, the exhaustive matching in S112 is performed only when the new set of K' images is not accessible to the image processing device 400. However, it is here noted that the exhaustive matching might be performed even if the new set of K' images indeed is accessible but where performing the sequential matching for the new set of K' images $$I'_{k'}$$

(as in S110) does not generate a good enough sparse 3D point cloud $$\Omega'_S.$$

S112 may then be performed for the new set of K' images $$I'_{k'}.$$

A summary of the thus far disclosed procedure is given in Table 1. In Table 1, $F_R{=}{=}1$ indicates that help data is accessible to the image processing device 400. Correspondingly, $F_R{=}{=}0$ indicates that such help data is not accessible to the image processing device 400.

TABLE 1

| | Summary of procedure |
|---|---|
| (1) | Generate sparse 3D point cloud using sequential matching |
| (2) IF $\Psi_{1, min} \geq \Theta_1$ and $\Psi_{2, min} \geq \Theta_2$ | Run densification to generate dense 3D point cloud based on sparse 3D point cloud from step (1) |
| (3) ELSE IF $\Psi_{1, min} < \Theta_1$ | |
| (3a) IF $F_R = 1$ | Obtain help data in terms of a new set of K' scanned images GO TO step (1) but use new set of K' images |
| (3b) ELSE IF $F_R = 0$ | Reliable enough scan cannot be obtained GO TO step (5) |
| (4) ELSE IF $\Psi_{2, K} < \Theta_2$ | |
| (4a) IF $F_R = 1$ | Obtain help data in terms of a new set of K' images with tagged objects GO TO step (1) but use new set of K' images |
| (4b) ELSE IF $F_R = 0$ | Reliable enough scan cannot be obtained GO TO step (5) |
| (5) ELSE | Generate sparse 3D point cloud using exhaustive matching and run densification to generate dense 3D point cloud based on this sparse 3D point cloud |

There could be different examples of algorithms for performing the exhaustive matching. In some non-limiting examples, the exhaustive matching is performed using a structure from motion (SfM) algorithm, or other types of exhaustive matching algorithms. One example of an exhaustive matching algorithm is provided in the paper by Schönberger, Johannes Lutz and Frahm, Jan Michael, entitled "Structure from Motion Revisited", published om the proceedings of the Conference on Computer Vision and Pattern Recognition (CVPR) in 2016. Another example of an exhaustive matching algorithm is provided in the paper by Sungjoon Choi, Qian-Yi Zhou, Vladlen Koltun, entitled "Robust Reconstruction of Indoor Scenes", published om the proceedings of the CVPR in 2015.

Likewise, there could be different examples of algorithms for performing the sequential matching. In some non-limiting examples, the sequential matching is performed using a 3D reconstruction algorithm with sequential, or incremental, pose tracking, such as a simultaneous localization and mapping (SLAM) algorithm. One examples of a SLAM algorithm is provided in the pater by Carlos Campos, Richard Elvira, Juan J. Gómez Rodríguez, José M. M. Montiel and Juan D. Tardós entitled "ORB-SLAM3: An Accurate Open-Source Library for Visual, Visual-Inertial and Multi-Map SLAM", published in IEEE Transactions on Robotics 37(6):1874-1890, December 2021.

Likewise, there could be different examples of algorithms for performing the densification. In some non-limiting examples, the densification is performed using a depth map fusion algorithm.

Further aspects of determining the reliability values $\Psi W_k$ and thus for determining how the dense 3D point cloud $\Omega_D$ is to be generated by densification of the sparse 3D point cloud as will be disclosed next.

The technique of determining reliability values $\Psi_k$ and comparing the lowest value of all determined reliability values to a threshold reliability value $\Theta$ is used since "ground truth" data, or information, is not available. That is, there not any previous 3D point cloud (sparse or dense) of the scene with which the sparse 3D point cloud $\Omega_S$ as generated in S102 can be compared with. By means of the reliability values an indirect assessment of the likelihood of having generated a successful sparse 3D point cloud can be made. As disclosed above, the reliability values are based on estimating how reliable the camera pose values resulting from the sequential matching process are.

In further detail, in each step in the sequential matching process, a new image is $I_k$ taken, features (key points) extracted and matched. An example of this is illustrated in FIG. 6. A scene 600 comprising an object in terms of a tree 610 is captured in consecutive images $I_{k-1}$, $I_k$, each with its own camera pose value $P_{k-1}$, $P_k$ (as illustrated by arrows 630, 630' in FIG. 6). A transition matrix $T_{k-1,k}$ describes how $P_k$ relates to $P_{k-1}$. That is:

$$P_k = T_{k-1,k}P_{k-1}$$

Each image comprises key points 620a, 620b, 620c, 620a', 620b', 620c', and the key points can be matched from image $I_{k-1}$ to image $I_k$, as illustrated by dotted lines. This matching of keypoints between consecutive images $I_{k-1}$, $I_k$ allows for estimation of the transition matrix $T_{k-1,k}$ from the previous camera pose $P_{k-1}$ to the current camera pose $P_{k-1}$. In general terms, the sensor pose value $P_k$ in the point cloud coordinate system is defined by its position $(n_x, n_y, n_z)$ and orientation angles $(\omega, \varphi, \tau)$. With a rotation matrix $R$ defined as:

$$R = \begin{pmatrix} 1 & 0 & 0 \\ 0 & \cos(\omega) & -\sin(\omega) \\ 0 & \sin(\omega) & \cos(\omega) \end{pmatrix} \begin{pmatrix} \cos(\varphi) & 0 & \sin(\varphi) \\ 0 & 1 & 0 \\ -\sin(\varphi) & 0 & \cos(\varphi) \end{pmatrix} \begin{pmatrix} \cos(\tau) & -\sin(\tau) & 0 \\ \sin(\tau) & \cos(\tau) & 0 \\ 0 & 0 & 1 \end{pmatrix}$$

12 and a translation vector n defined as:

$$n = \begin{bmatrix} n_x \\ n_y \\ n_z \end{bmatrix}$$

the pose in homogenous coordinates is defined as:

$$P = \begin{bmatrix} R & n \\ 0 & 1 \end{bmatrix}$$

Therefore, the transition matrix $T_{k-1,k}$ is of the form:

$$T_{k-1,k} = \begin{bmatrix} TR_{k-1,k} & tn_{k-1,k} \\ 0 & 1 \end{bmatrix}$$

Where $TR_{k-1,k}$ and $tn_{k-1,k}$ are determined as rotation and translation that maps key points from $I_{k-1}$ to the they counterparts in $I_k$ with the smallest error.

Any error in $T_{k-1,k}$ will propagate and will bring accumulative error to the estimate of all future camera pose values. This issue might be mitigated in a bundle adjustment step if the error is small. But there are other situations where such correction is not possible.

In general terms, the cause of errors in $T_{k-1,k}$ is the lack of good correspondence between consecutive images $I_k$, $I_{k-1}$. One reason for this is due to data acquisition issues, such as rapid sensor movements (leading to insufficient overlap between consecutive images), rotational movements between consecutive images, etc. Another reason for this is due to image properties, such as texture-less regions in the images, such as where key points cannot be extracted and matched, poor lighting conditions when capturing the images, etc.

The calculation of $\Psi_{1,k}$ creates a measure of inaccuracies in the data acquisition process. The calculation of $\Psi_{2,k}$ creates a measure of inaccuracies due to the image properties. Finding the lowest values $\Psi_{1,min}$ and $\Psi_{2,min}$ exploits the fact that when the camera pose is incrementally tracked, the largest error will dominate the process and determine the failure or success of the 3D map generation.

Re-projection of a point $m=[m_x, m_y, m_z]$ from the 3D point cloud to the camera coordinate system corresponding to pose $P_k$ is given by:

$$m^* = P^T m$$

Next, $m^*=[m^*_x, m^*_y, m^*_z]$ is converted into 2D image coordinates $[u^*, v^*]$ as:

$$[u^*, v^*] = \left[ -f\frac{m^*_x}{m^*_z}, -f\frac{m^*_y}{m^*_z} \right] + [s_x, s_y]$$

where f is the focal length, and $s_x$, $s_y$ are principal points.

The value of $V_k$ required for calculation of $\Psi_{1,k}$ can be found by re-projecting the boundaries of the overlapping region in the physical scene back to the image plane. Then the number of pixels confined by this area in the image plane is normalized with total number of pixels $W_k$.

The reason for performing re-projection in determining the area $V_k$ is that the distance between consecutive camera poses alone could be a poor predictor of the actual image overlap in the physical world. Scene geometry also affects the overlapping part of the physical scene "seen" in consecutive images. An illustration of this is provided in FIG. 7. FIG. 7 schematically illustrates that the shape and size of overlapping area is a complex function of distance to the physical world, camera intrinsics, point of view, and the change in angle (i.e., a change of pose) made for a camera between two different image captures. In particular, FIG. 7 shows a top view of how the overlapping area 720, 720' of a scene changes in shape and size from a first setting 710 of two cameras (with individual areas 730a, 730b and overlapping area 720) to a second setting 710' of the two cameras (with individual areas 730a', 730b' and overlapping area 720') where a rotational movement (i.e., a change of pose) of one of the cameras has been made between the first setting 710 and the second setting 710'.

FIG. 8 schematically illustrates, in terms of a number of functional units, the components of an image processing device 400 according to an embodiment. Processing circuitry 810 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 830. The processing circuitry 810 may further be provided as at least one application specific integrated circuit (ASIC), or field programmable gate array (FPGA).

Particularly, the processing circuitry 810 is configured to cause the image processing device 400 to perform a set of operations, or steps, as disclosed above. For example, the storage medium 830 may store the set of operations, and the processing circuitry 810 may be configured to retrieve the set of operations from the storage medium 830 to cause the image processing device 400 to perform the set of operations. The set of operations may be provided as a set of executable instructions.

Thus the processing circuitry 810 is thereby arranged to execute methods as herein disclosed. The storage medium 830 may also comprise persistent storage, which, for example, can be any single one or combination of magnetic memory, optical memory, solid state memory or even remotely mounted memory. The image processing device 400 may further comprise a communications interface 820 at least configured for communications with other entities, functions, nodes, and devices. As such the communications interface 820 may comprise one or more transmitters and receivers, comprising analogue and digital components. The processing circuitry 810 controls the general operation of the image processing device 400 e.g. by sending data and control signals to the communications interface 820 and the storage medium 830, by receiving data and reports from the communications interface 820, and by retrieving data and instructions from the storage medium 830. Other components, as well as the related functionality, of the image processing device 400 are omitted in order not to obscure the concepts presented herein.

FIG. 9 schematically illustrates, in terms of a number of functional modules, the components of an image processing device 400 according to an embodiment. The image processing device 400 of FIG. 9 comprises a number of functional modules; a sequential matching module 910 configured to perform step S102, a determine module 920 configured to perform step S104, and a densification module 960 configured to perform steps S114a, 114b, 114c. The image processing device 400 of FIG. 9 may further comprise a number of optional functional modules, such as a check module 930 configured to perform step S108, a sequential matching module 940 configured to perform step S110, and an exhaustive matching module 950 configured to perform step S112. In general terms, each functional module 910:960 may in one embodiment be implemented only in hardware and in another embodiment with the help of software, i.e., the latter embodiment having computer program instructions stored on the storage medium 830 which when run on the processing circuitry makes the image processing device 400 perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 910:960 may be implemented by the processing circuitry 810, possibly in cooperation with the communications interface 820 and/or the storage medium 830. The processing circuitry 810 may thus be configured to from the storage medium 830 fetch instructions as provided by a functional module 910:960 and to execute these instructions, thereby performing any steps as disclosed herein.

The image processing device 400 may be provided as a standalone device or as a part of at least one further device. For example, a first part of the image processing device 400 may be implemented in the first type of computing device 120. The first part might correspond to the implementation of the sequential matching algorithm. For example, a second part of the image processing device 400 may be implemented in the second type of computing device 130. The second part might correspond to the implementation of the exhaustive matching algorithm.

However, the herein disclosed embodiments are not limited to any particular number of devices on which the instructions performed by the image processing device 400 may be executed. Hence, the methods according to the herein disclosed embodiments are suitable to be performed by an image processing device 400 residing in a cloud computational environment. Therefore, although a single processing circuitry 810 is illustrated in FIG. 8 the processing circuitry 810 may be distributed among a plurality of devices, or nodes. The same applies to the functional modules 910:960 of FIG. 9 and the computer program 1020 of FIG. 10.

FIG. 10 shows one example of a computer program product 1010 comprising computer readable storage medium 1030. On this computer readable storage medium 1030, a computer program 1020 can be stored, which computer program 1020 can cause the processing circuitry 810 and thereto operatively coupled entities and devices, such as the communications interface 820 and the storage medium 830, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus)

memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for generating a dense three-dimensional (3D) point cloud $\Omega_D$ of a scene, the method being performed by an image processing device, the method comprising:

performing sequential matching for a set of K images $I_k$, where k=1 . . . K, obtained from an image scan of the scene, where each image $I_k$ has a color value and a depth value, to establish a correspondence between consecutive images $I_k$, $I_{k-1}$ in the set of K images, to generate a sparse 3D point cloud $\Omega_S$ from the K images, and to estimate one camera pose value $P_k$ for each image $I_k$;

determining one reliability value $\Psi_k$ for each camera pose value $P_k$; and generating the dense 3D point cloud $\Omega_D$, when a lowest value of all determined reliability values $\Psi_k$, k=1 . . . K, is larger than a threshold reliability value $\Theta$, by densification of the sparse 3D point cloud $\Omega_S$ and using the estimated camera pose values $P_k$, k=1 . . . K.

2. The method according to claim 1, wherein the reliability value $\Psi_k$ for each image $I_k$ pertains to:

a relative overlap in image areas between the consecutive images $I_k$, $I_{k-1}$; and/or a relative number of matching keypoints $N_k$, based on which the correspondence between consecutive images $I_k$, $I_{k-1}$ was established, per overlap in image areas between the consecutive images $I_k$, $I_{k-1}$; and/or a ratio between an area $V_k$ and an image area $W_k$, wherein each image $I_k$ has an image area $W_k$ and wherein consecutive images $I_k$, $I_{k-1}$ overlap an area $V_k$ in image $I_k$.

3. The method according to claim 1, wherein one set of matching keypoints $N_k$ based on which the correspondence between consecutive images $I_k$, $I_{k-1}$ was established is identified for each image $I_k$, wherein consecutive images $I_k$, $I_{k-1}$ overlap an area $V_k$ in image $I_k$, and wherein the reliability value $\Psi_k$ for image $I_k$ pertains to a ratio between the number of matching keypoints $N_k$ and the area $V_k$.

4. The method according to claim 1, wherein the method further comprises:

performing, when the lowest value of all determined reliability values $\Psi_k$, k=1 . . . K, is not larger than the threshold reliability value $\Theta$, sequential matching for a new set of K' images $$I'_{k'}, k' = 1 \ldots K',$$

obtained from a new image scan of the scene, where each new image $$I'_k,$$

has a color value and a depth value, and where the new set of K' images comprises help data as compared to the set of K images, to establish a correspondence between consecutive images $$I'_{k'}, I'_{k'-1}$$

in the set of K' images, to generate a new sparse 3D point cloud $$\Omega'_S$$

from the K' images, and to estimate one new camera pose value $$P'_k$$

for each image $$I'_{k'};$$

and generating the dense 3D point cloud $\Omega_D$ by performing densification of the new sparse 3D point cloud $$\Omega'_S$$

and using the new estimated camera pose values $$P'_k, k' = 1 \ldots K'.$$

5. The method according to claim 4, wherein the help data is provided in terms of:

the new set of K' images being larger than the set of K images when $$\Psi_k = \frac{V_k}{W_k} < \Theta;$$

or the new set of K' images comprising more tagged objects than the set of K images when $$\Psi_k = \frac{N_k}{V_k} < \Theta.$$

6. The method according to claim 4, wherein the method further comprises:

checking whether the help data is accessible or not to the image processing device, and wherein the sequential matching for the new set of K' images is performed when the help data is accessible to the image processing device.

7. The method according to claim 1, wherein the method further comprises:

performing, when the lowest value of all determined reliability values $\Psi_k$, k=1 . . . K, is not larger than the threshold reliability value $\Theta$, exhaustive matching for the set of K images $I_k$, k=1 . . . K, to generate a new sparse 3D point cloud $$\Omega_S''$$

from the K images and to estimate one camera pose value $$P_k''$$

for each image $I_k$; and generating the dense 3D point cloud $\Omega_D$ by performing densification of the new sparse 3D point cloud $$\Omega_S''$$

and using the new estimated camera pose values $$P_k'', k = 1 \ldots K.$$

8. The method according to claim 7, wherein the exhaustive matching is performed:

when the new set of K' images is not accessible to the image processing device; and/or using a structure from motion (SfM) algorithm.

9. The method according to claim 1, wherein the sequential matching is performed using a simultaneous localization and mapping (SLAM) algorithm.

10. The method according to claim 1, wherein the densification is performed using a depth map fusion algorithm.

11. An image processing device for generating a dense three-dimensional (3D) point cloud $\Omega_D$ of a scene, the image processing device comprising processing circuitry, the processing circuitry being configured to cause the image processing device to:

perform sequential matching for a set of K images $I_k$, where k=1 . . . K, obtained from an image scan of the scene, where each image $I_k$ has a color value and a depth value, to establish a correspondence between consecutive images $I_k$, $I_{k-1}$ in the set of K images, to generate a sparse 3D point cloud $\Omega_S$ from the K images, and to estimate one camera pose value $P_k$ for each image $I_k$;

determine one reliability value $\Psi_k$ for each camera pose value $P_k$; and generate the dense 3D point cloud $\Omega_D$, when a lowest value of all determined reliability values $\Psi_k$, k=1 . . . K, is larger than a threshold reliability value $\Theta$, by densification of the sparse 3D point cloud $\Omega_S$ and using the estimated camera pose values $P_k$, k=1 . . . K.

12. The image processing device according to claim 11, wherein the reliability value $\Psi_k$ for each image $I_k$ pertains to:

a relative overlap in image areas between the consecutive images $I_k$, $I_{k-1}$; and/or a relative number of matching keypoints $N_k$, based on which the correspondence between consecutive images $I_k$, $I_{k-1}$ was established, per overlap in image areas between the consecutive images $I_k$, $I_{k-1}$; and/or a ratio between an area $V_k$ and an image area $W_k$, wherein each image $I_k$ has an image area $W_k$ and wherein consecutive images $I_k$, $I_{k-1}$ overlap an area $V_k$ in image $I_k$.

13. The image processing device according to claim 11, wherein one set of matching keypoints $N_k$ based on which the correspondence between consecutive images $I_k$, $I_{k-1}$ was established is identified for each image $I_k$, wherein consecutive images $I_k$, $I_{k-1}$ overlap an area $V_k$ in image $I_k$, and wherein the reliability value $\Psi_k$ for image $I_k$ pertains to a ratio between the number of matching keypoints $N_k$ and the area $V_k$.

14. The image processing device according to claim 11, the processing circuitry being further configured to cause the image processing device to:

perform, when the lowest value of all determined reliability values $\Psi_k$, k=1 . . . K, is not larger than the threshold reliability value $\Theta$, sequential matching for a new set of K' images $$I_{k'}', k' = 1 \ldots K',$$

obtained from a new image scan of the scene, where each new image $$I_{k'}'$$

has a color value and a depth value, and where the new set of K' images comprises help data as compared to the set of K images, to establish a correspondence between consecutive images $$I_{k'}', I_{k'-1}'$$

In the set of K' images, to generate a new sparse 3D point cloud $$\Omega_S'$$

from the K'images, and to estimate one new camera pose value $$P_k'$$

for each image $$I_{k'}';$$

and generate the dense 3D point cloud 2) by performing densification of the new sparse 3D point cloud $$\Omega_S'$$

and using the new estimated camera pose values $\qquad$ 5

$$P_k', k' = 1 \ldots K'.$$

10

15. The image processing device according to claim 14, wherein the help data is provided in terms of:

the new set of K' images being larger than the set of K images when

15

$$\Psi_k = \frac{V_k}{W_k} < \Theta;$$

or $\qquad$ 20 the new set of K' images comprising more tagged objects than the set of K images when $$\Psi_k = \frac{N_k}{V_k} < \Theta.$$ 25

16. The image processing device according to claim 14, the processing circuitry being further configured to cause the image processing device to:

checking whether the help data is accessible or not to the image processing device, and wherein the sequential matching for the new set of K' images is performed when the help data is accessible to the image processing device.

17. The image processing device according to claim 11, the processing circuitry being further configured to cause the image processing device to:

performing, when the lowest value of all determined reliability values $\Psi_k$, k=1 . . . K, is not larger than the 40 threshold reliability value $\Theta$, exhaustive matching for the set of K images $I_k$, k=1 . . . K, to generate a new sparse 3D point cloud

45

$$\Omega_S''$$

from the K images and to estimate one camera pose value 50

$$P_k''$$

55 for each image $I_k$; and generating the dense 3D point cloud (2) by performing densification of the new sparse 3D point cloud $$\Omega_S''$$

and using the new estimated camera pose values $$P_k'', k = 1 \ldots K.$$

18. The image processing device according to claim 17, the processing circuitry being configured to cause the image processing device to perform the exhaustive matching:

when the new set of K' images is not accessible to the image processing device; and/or using a structure from motion (SfM) algorithm.

19. The image processing device according to claim 11, the processing circuitry being configured to cause the image processing device to perform the sequential matching using a simultaneous localization and mapping (SLAM) algorithm.

20. The image processing device according to claim 11, the processing circuitry being configured to cause the image processing device to perform the densification using a depth map fusion algorithm.

21. A non-transitory computer-readable storage medium on which is stored a computer program for generating a dense three-dimensional (3D) point cloud $\Omega_D$ of a scene, the computer program comprising computer code which, when run on processing circuitry of an image processing device, causes the image processing device to:

perform sequential matching for a set of K images $I_k$, where k=1 . . . K, obtained from an image scan of the scene, where each image $I_k$ has a color value and a depth value, to establish a correspondence between consecutive images $I_k$, $I_{k-1}$ in the set of K images, to generate a sparse 3D point cloud $\Omega_S$ from the K images, and to estimate one camera pose value $P_k$ for each image $I_k$;

determine one reliability value $\Psi_k$ for each camera pose value $P_k$; and generate the dense 3D point cloud $\Omega_D$, when a lowest value of all determined reliability values $\Psi_k$, k=1 . . . K, is larger than a threshold reliability value $\Theta$, by densification of the sparse 3D point cloud $\Omega_S$ and using the estimated camera pose values $P_k$, k=1 . . . . K.

\* \* \* \* \*